United States Patent
Keller et al.

(10) Patent No.: US 8,419,076 B2
(45) Date of Patent: Apr. 16, 2013

(54) PLUG CONNECTION ARRANGEMENT

(75) Inventors: Uwe Keller, Gelnhausen (DE); Artur Kari, Gelnhausen (DE); Joerg Funke, Finnentrop (DE)

(73) Assignees: Veritas AG, Gelnhausen (DE); Muhy und Bender KG, Attendorn (DE)

( * ) Notice: Subject to any disclaimer, the term of this patent is extended or adjusted under 35 U.S.C. 154(b) by 319 days.

(21) Appl. No.: 12/769,684

(22) Filed: Apr. 29, 2010

(65) Prior Publication Data

US 2010/0282329 A1 Nov. 11, 2010

(30) Foreign Application Priority Data

May 9, 2009 (DE) .......................... 10 2009 020 577

(51) Int. Cl.
*F16L 37/00* (2006.01)

(52) U.S. Cl.
USPC ............................. 285/314; 285/23; 285/305

(58) Field of Classification Search ............ 285/23, 285/308, 309, 314, 317, 318, 305
See application file for complete search history.

(56) References Cited

U.S. PATENT DOCUMENTS

| | | | | |
|---|---|---|---|---|
| 373,292 A * | 11/1887 | Jacobson et al. | ............ | 285/314 |
| 747,412 A * | 12/1903 | Getz | ............... | 285/314 |
| 1,069,904 A * | 8/1913 | Sanders | .......... | 285/314 |
| 1,369,304 A * | 2/1921 | Schram | ........... | 285/314 |
| 1,477,440 A | 12/1923 | Grier, Jr. | | |
| 1,544,004 A * | 6/1925 | Henderson | ................ | 285/314 |
| 2,004,967 A * | 6/1935 | Williams | ................ | 285/314 |
| 5,131,687 A * | 7/1992 | Marchou | ................ | 285/23 |
| 5,620,209 A | 4/1997 | Sauer | | |
| 7,690,694 B2 * | 4/2010 | Poder | ............ | 285/314 |
| 2001/0040377 A1 | 11/2001 | Bandlow et al. | | |
| 2008/0084061 A1 | 4/2008 | Kertesz et al. | | |
| 2009/0218807 A1 | 9/2009 | Seryi | | |

FOREIGN PATENT DOCUMENTS

| | | |
|---|---|---|
| DE | 691 01 804 T2 | 8/1994 |
| DE | 195 06 144 C1 | 5/1996 |
| DE | 196 21 670 A1 | 12/1997 |
| DE | 10 2006 047 882 B3 | 10/2006 |
| DE | 10 2006 047 882 B3 | 8/2007 |
| DE | 10 2007 045 023 A1 | 4/2009 |
| DE | 10 2008 005 619 A1 | 7/2009 |
| EP | 0 452 172 A1 | 10/1991 |
| EP | 0 924 453 A1 | 6/1999 |
| EP | 1 821 022 A1 | 8/2007 |
| FR | 2 897 668 | 8/2007 |

* cited by examiner

*Primary Examiner* — David E Bochna
(74) *Attorney, Agent, or Firm* — Harness, Dickey & Pierce, P.L.C.

(57) ABSTRACT

Plug connection arrangement for connecting a first hollow body, such as a pipe socket, to a second hollow body, such as a hose, by means of a clip. The first hollow body has a pre-assembly portion, on which the clip can be pre-assembled in a pre-assembly position. The first hollow body has a final assembly portion to which the clip is secured in a final assembly position. The pre-assembly portion and the final assembly portion are offset in the peripheral direction of the first hollow body, so that the clip can be transferred from the pre-assembly position into the final assembly position by twisting relative to the first hollow body.

6 Claims, 2 Drawing Sheets

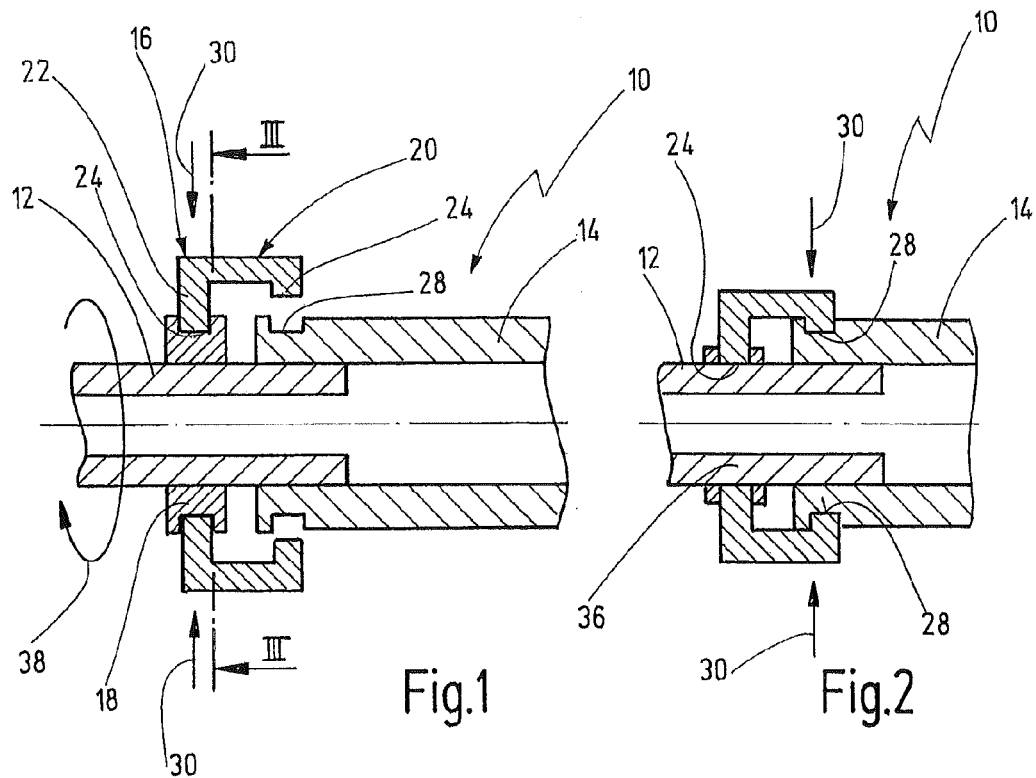
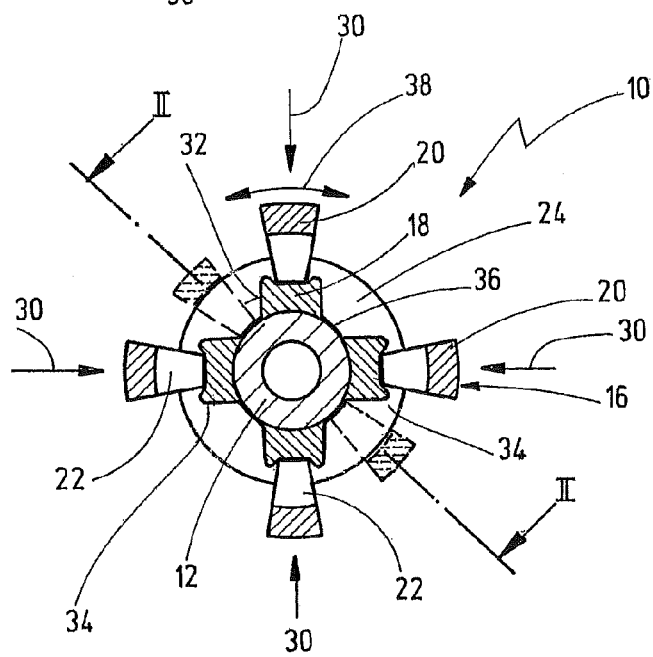

PLUG CONNECTION ARRANGEMENT

CROSS-REFERENCE OF RELATED APPLICATIONS

This application claims the priority of German patent applications DE 10 2009 020 577, filed May 9, 2009. The entire contents of this priority application are incorporated herein by reference.

BACKGROUND OF THE INVENTION

The present invention relates to a plug connection arrangement for connecting a first hollow body, such as a pipe socket, to a second hollow body, such as a hose, by means of a clip, wherein the first hollow body has a pre-assembly portion, on which the clip can be pre-assembled in a pre-assembly position, and wherein the first hollow body has a final assembly portion, to which the clip for connecting the first hollow body to the second hollow body is secured in a final assembly position.

A plug connection arrangement of this type is known from document DE 196 21 670 A1.

DE 196 21 670 A1 shows a plug connection arrangement for connecting a hose end to a pipe socket, wherein on the pipe socket a clip is pre-assembled, which, when the hose end is slipped on, is axially transferred into a final assembly position. In the final assembly position, the clip is connected in the axial direction positively to the pipe socket and non-positively to the hose end.

DE 195 06 144 C1 discloses a plug connection arrangement in which a spring clip is expanded under tension and is held in this state by means of a clamp. In this pre-assembly position, the spring clip can additionally be secured to a locking ring connected to the pipe socket.

Document DE 10 2006 047 882 B3 discloses a further plug connection arrangement, in which a sleeve is clampingly connected to a hose end. A connecting ring is latch-locked in a pre-assembly position to the sleeve. When the hose end is slipped onto a socket, the connecting ring additionally latches into a peripheral groove on the outer periphery of the socket.

BRIEF SUMMARY OF THE INVENTION

In the light of the above background, one object of the invention consists in defining an improved plug connection arrangement which enables, in particular, a simple and secure final assembly for connection of the two hollow bodies.

This object is achieved by a plug connection arrangement for connecting a first hollow body, such as a pipe socket, to a second hollow body, such as a hose, by means of a clip, wherein the first hollow body has a pre-assembly portion, on which the clip can be pre-assembled in a pre-assembly position, and wherein the first hollow body has a final assembly portion, to which the clip for connecting the first hollow body to the second hollow body is secured in a final assembly position, wherein the pre-assembly portion and the final assembly portion are arranged offset in the peripheral direction of the first hollow body, so that the clip can be transferred from the pre-assembly position into the final assembly position by twisting relative to the first hollow body.

The present invention is further achieved by a method for connecting a first hollow body, such as a pipe socket, to a second hollow body, such as a hose, by means of a clip, comprising the steps: pre-assembly of the clip on a pre-assembly portion of the first hollow body, axial fitting-together of the first and the second hollow body, and finally twisting of the clip relative to the first hollow body, so that the clip ends up in a final assembly position.

The plug connection arrangement can be realized with few components. The final assembly can be effected by a simple twisting operation. Furthermore, a more secure pre-assembly of the clip on the first hollow body can thereby be obtained.

The object is thus completely achieved.

It is of particular advantage if the pre-assembly portion has a larger outer diameter than the final assembly portion, so that the second hollow body can be slipped axially onto the first hollow body in such a way that at least a portion of the second hollow body is disposed radially within the clip.

Hence the hollow bodies can be slipped one into the other and the clip can then engage with the outer periphery of the second hollow body to create the plug connection.

In addition, it is advantageous if the pre-assembly portion and the final assembly portion are connected to each other in the peripheral direction by a peripheral contour.

The twisting operation for the establishment of the final assembly position can hence be purposefully influenced via the peripheral contour. In addition, the peripheral contour is preferably of continuous configuration, so that no purely radially running steps or the like are contained. This allows greater control during the twisting operation.

In this context, it is of particular advantage if the peripheral contour has between the pre-assembly portion and the final assembly portion a locking portion.

It is thereby possible to ensure that the clip cannot accidentally come loose from the pre-assembly position, for instance during transport. In particular, the clip can thereby be prevented from accidentally making its way already into the final assembly position in the course of such transport or the like.

It is here of particular advantage if the locking portion has a larger outer diameter than the pre-assembly portion.

The locking portion can hence be realized in simple design, in particular as part of the peripheral contour.

In addition, the clip is preferably a spring clip, which is tensioned by radial expansion.

In this embodiment, the clip can firstly be radially expanded out of its slackened state for transfer into the pre-assembly position. In the pre-assembly position, the spring clip is then held by a radially inward acting elastic restoring force.

Accordingly, it is preferred if the spring clip, in the pre-assembly position, is tensioned.

All in all, it is additionally advantageous if the clip has at least one first radial tongue, which in the pre-assembly position and/or in the final assembly position engages in a peripheral groove of the first hollow body.

As a result of this measure, it is possible to ensure that the clip, in the pre-assembly position and/or in the final assembly position, is secured in the axial direction to the first hollow body. If the clip is a spring clip, the radial tongue is forced elastically into the peripheral groove, so that transport safety can be increased still further.

In general, it is conceivable to provide just a single first radial tongue, which can extend, for example, up to 180° over the periphery. It is particularly preferred, however, if a plurality of first radial tongues are provided on the clip, distributed over the periphery.

According to another preferred embodiment, which in the present case, in conjunction with the plug connection arrangement stated in the introduction, constitutes an individual invention, the clip has at least one first radial tongue, which in the pre-assembly position and/or in the final assembly position engages in a peripheral groove of the first hollow body, the clip additionally having at least one second radial tongue, which in the final assembly position engages in a radial groove of the second hollow body.

In this embodiment, particularly when the first radial tongue, at least in the final assembly position, engages in a peripheral groove of the first hollow body, a positive connection can be established, by means of the clip, in the axial direction between the first hollow body and the second hollow body. Accordingly, the plug connection can have a high security of connection.

The second radial tongue can also be configured as a single radial tongue, as described above. Preferably, a plurality of second radial tongues can be provided also in this case, which tongues are arranged distributed over the periphery of the clip.

It is here of particular advantage if the second radial tongue is shorter than the first radial tongue.

It is thereby made easier to plug the hollow bodies one into the other before the clip is transferred, in particular twisted, from the pre-assembly position into the final assembly position.

All in all, it is further advantageous if the first and/or the second hollow body has a peripheral groove, in which a sealing ring is inserted and which in the final assembly state is covered by the other hollow body in order to seal the inside of the hollow bodies with respect to the environment.

A direct sealing effect can hence be established between the first hollow body and the second hollow body, so that a high leak-tightness can be obtained.

Although the present plug connection preferably serves for the plug connection of two hollow bodies through which, preferably, a fluid such as charge air can be conducted, the plug connection according to the invention is similarly applicable to connections of solid bodies. The first hollow body and/or the second hollow body can thus be configured as solid bodies, one of the bodies having, for instance, an annular flange portion, which is slipped onto a corresponding receiving portion of the other body. The term "hollow body" which is used in the present case should therefore be widely interpreted in this sense.

In addition, the plug connection arrangement according to the invention also allows, according to the embodiment, a reliable inspection of the completed connection. In other words, it is relatively easy to detect from outside whether the clip is in the correct final assembly position. This applies, in particular, when a first and a second radial tongue engage in corresponding grooves of the first hollow body and second hollow body respectively. This is clearly discernible from outside and can therefore be easily checked.

BRIEF DESCRIPTION OF THE DRAWINGS

Self-evidently, the above-stated features and the features yet to be set out below are usable not only in the respectively defined combination, but also in other combinations or in isolation, without departing from the scope of the present invention.

Illustrative embodiments of the invention are represented in the drawing and are explained in greater detail in the following description, wherein:

FIG. 1 shows a schematic longitudinal sectional view of an embodiment of a plug connection arrangement according to the invention, with a clip in a pre-assembly position;

FIG. 2 shows the plug connection of FIG. 1, with the clip in a final assembly position;

FIG. 3 shows a sectional view along the line of FIG. 1;

DETAILED DESCRIPTION OF THE PREFERRED EMBODIMENTS

Figure 4:
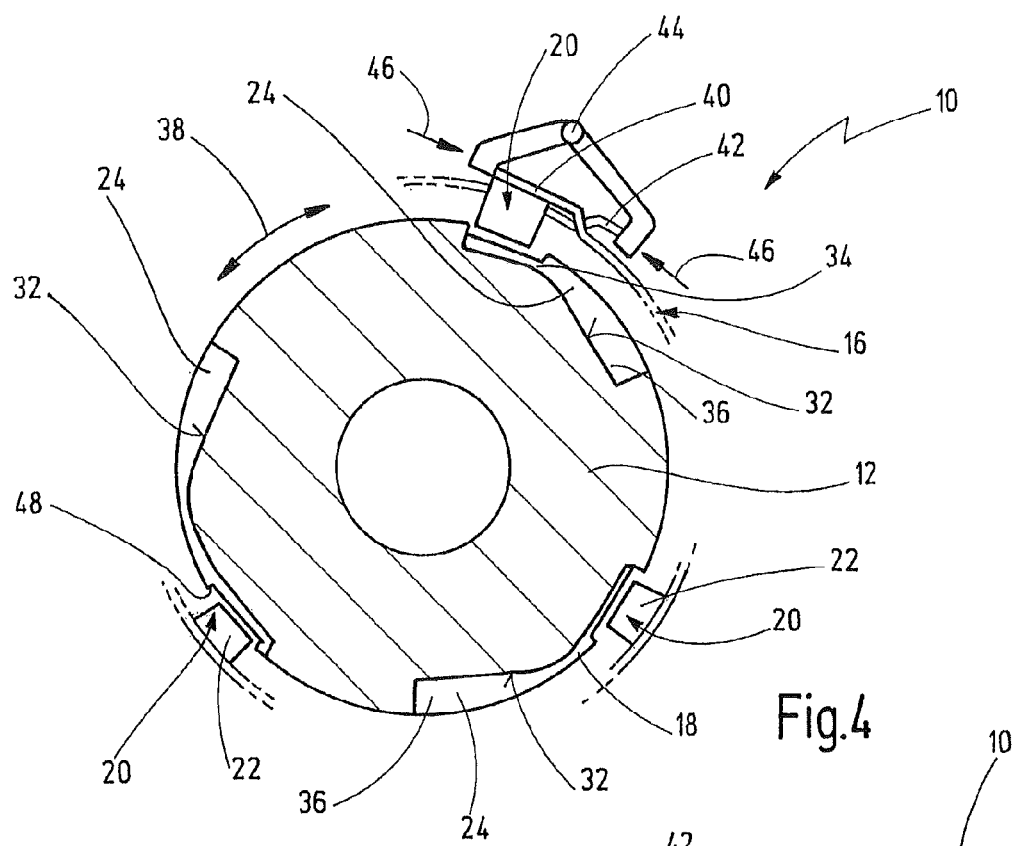
FIG. 4 shows a schematic cross-sectional view through a plug connection arrangement according to a further embodiment of the invention.

In FIGS. 1 to 3, a plug connection arrangement is denoted in general terms by 10.

The plug connection arrangement 10 contains a pipe socket 12, which can be, for instance, part of a turbocharger. In addition, the plug connection arrangement 10 has a hose 14, which can be constituted, for instance, by a charge-air line. The plug connection arrangement 10 further contains a spring clip 16, by means of which the pipe socket 12 and the hose 14 can be fixed in the fitted-together state.

The pipe socket 12 here has an outer diameter which is matched to the inner diameter of the hose 14, so that the hose 14 can be slipped over the pipe socket 12 in the axial direction.

The pipe socket 12 has a pre-assembly portion 18, to which the spring clip 16 is secured in a pre-assembly position, as is represented in FIG. 1. The pre-assembly portion 18 can be formed by a separate component fastened to the outer periphery of the pipe socket 12, but can also be configured in one piece with the pipe socket 12.

The spring clip 16 has, distributed over the periphery, a plurality of, in the represented embodiment four holding portions 20, which are arranged mutually offset by 90°, as is shown in FIG. 3. In FIG. 1, two of the holding portions 20 are shown. Each holding portion has a first radial tongue 22, which engages in a peripheral groove 24 of the pre-assembly portion 18. The spring clip 16 is thereby axially fixed to the pipe socket 12 in the shown pre-assembly position. To this end, the spring clip 16 is radially expanded to enable the first radial tongues 22 then to be introduced into the peripheral groove 24, the spring clip 16, in the pre-assembly position, being pretensioned.

The holding portions 20 further respectively contain a second radial tongue 26, which are arranged axially offset towards the free end of the pipe socket 12. The second radial tongues 26 are here arranged such that at least a portion of the hose 14 which is slipped onto the pipe socket 12 lies radially within the first radial tongues 22. The second radial tongues 26 are preferably shorter than the first radial tongues 22. In addition, the second radial tongues 26 are arranged in the pre-assembly position shown in FIG. 1 such that the hose 14 can be guided past the second radial tongues 26 substantially without contact.

On the outer periphery of the hose 24 is configured a radial groove 28, in which the second radial tongues 26 engage when the spring clip 16 is in a final assembly position, as shown in FIG. 2.

The pipe socket 12 and the hose 14 can hence be positively connected to each other in the axial direction by means of the spring clip 16. Both in the pre-assembly position and in the final assembly position, a radially inward pointing spring tension 30 is in force, which, on the one hand, holds the spring clip 16 in the peripheral groove 24 or the radial groove 28 and, on the other hand, applies a radial force to the portion in which the hose 14 overlaps the pipe socket 12. Consequently, both an axial form closure and a certain sealing effect can thereby be obtained.

As can be seen, in particular, in FIG. 3, the floor of the peripheral groove 24 forms a peripheral contour 32. The peripheral contour 32 here has, distributed over the periphery, four pre-assembly portions 18 of relatively large outer diameter. In addition, the peripheral contour 32 has, situated therebetween, four final assembly portions 36 of distinctly smaller outer diameter. Between the pre-assembly portions 18 and the final assembly portions 36, a locking portion 34 is respectively provided, which has a still larger outer diameter than the pre-assembly portion 18. Accordingly, the spring clip 16, in the pre-assembly position shown in FIGS. 1 and 3, is held also in the peripheral direction 38.

In order to move the spring clip 16 from the pre-assembly position shown in FIGS. 1 and 3 into the final assembly position shown in FIG. 2, it is merely necessary to twist the spring clip 16 in relation to the pipe socket 12. The first radial tongues 22 here run with their inner periphery along the peripheral contour 32. A locking portion 34 is respectively first traversed by the first radial tongues 22. The spring clip 16 hereupon radially expands, so that a somewhat increased force expenditure is necessary for this. After this, the first radial tongues 22 are forced by the spring tension 30 into the final assembly portions 36, as is shown in dashed representation in FIG. 3 for two of the radial tongues 22. A section along the line II-II in FIG. 3 corresponds to the representation of FIG. 2.

The spring clip 16 can be configured in the peripheral direction 38 substantially continuously from one piece. Preferably, the spring clip 16 here has a first clip end and a second clip end, which overlap in the peripheral direction 38, so that an expansion of the spring clip 16 for insertion into the pre-assembly position is possible by pressing-together of the clip ends.

An embodiment of this type is shown in FIG. 4. The plug connection arrangement 10 of FIG. 4 corresponds in general terms, with respect to structure and working method, to the plug connection arrangement 10 of FIGS. 1 to 3. Same elements therefore have the same reference numerals. Essentially only the differences are described below.

The spring clip 16 of FIG. 4 has a first clip end 40 and a second clip end 42, which mutually overlap. By means of a collet or some other gripping apparatus 44, the clip ends 40, 42 can be gripped and pressed together, as is indicated by an expansion force 46. The spring clip 16 is thereby expanded in the radial direction, so that it can be moved into the pre-assembly position on the pipe socket 12.

The pipe socket 12 here has for each of the holding portions 20, which respectively has a first radial tongue 22 and a second radial tongue 26, a respective axial groove 48, so that the first radial tongues 22 can be introduced relatively easily into the peripheral groove 24. In the plug connection arrangement 10 of FIG. 4, the peripheral groove 24 is not continuously configured in the peripheral direction 38, but is divided into a plurality of portions. The number of portions corresponds to the number of holding portions 20; in the representation of FIG. 4 there are three holding portions, which are respectively mutually offset, say, by 120°.

The spring clip 16 is formed from a spring band extending in the peripheral direction 38, a holding portion 20 being configured on the first clip end 40. The second clip end 42 passes in the radial direction through a recess (not represented in detail in FIG. 4) of the first clip end 40, so that the collet 44 can easily engage on the clip ends 40, 42.

Figure 5:
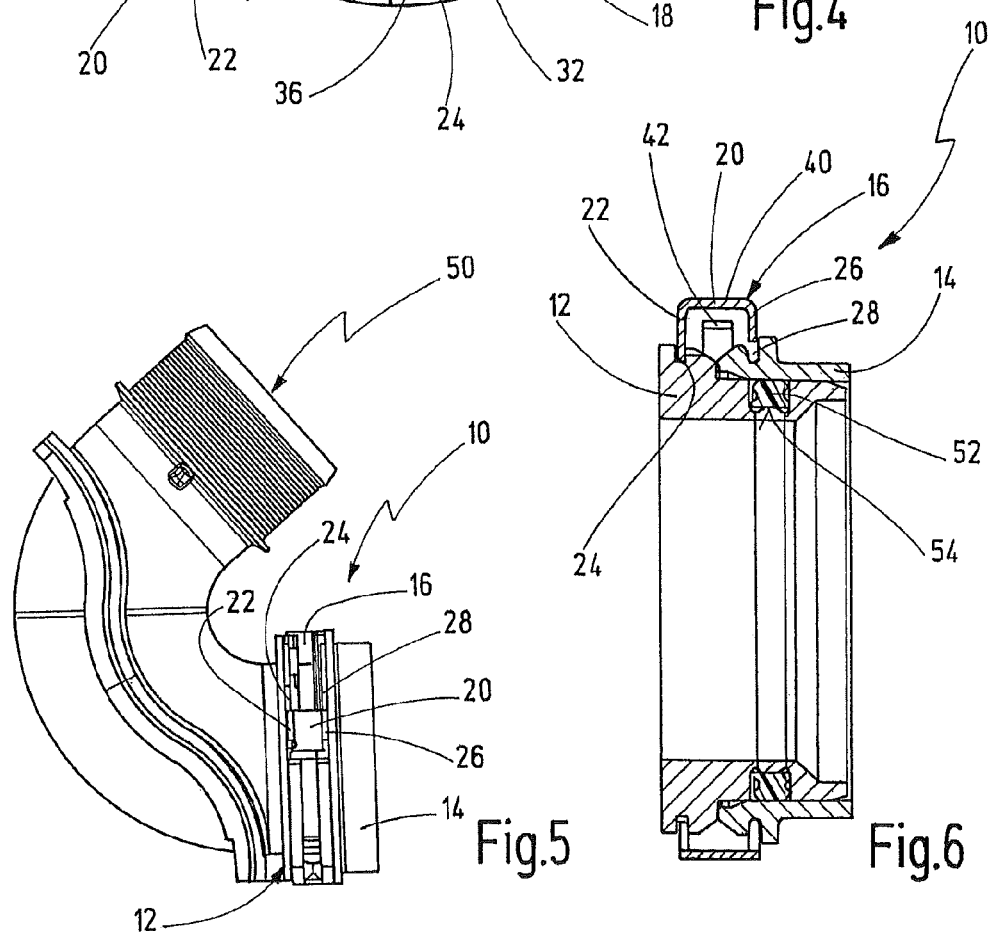
FIG. 5 shows a top view of a plug connection arrangement according to a further embodiment of the invention.
Figure 6:
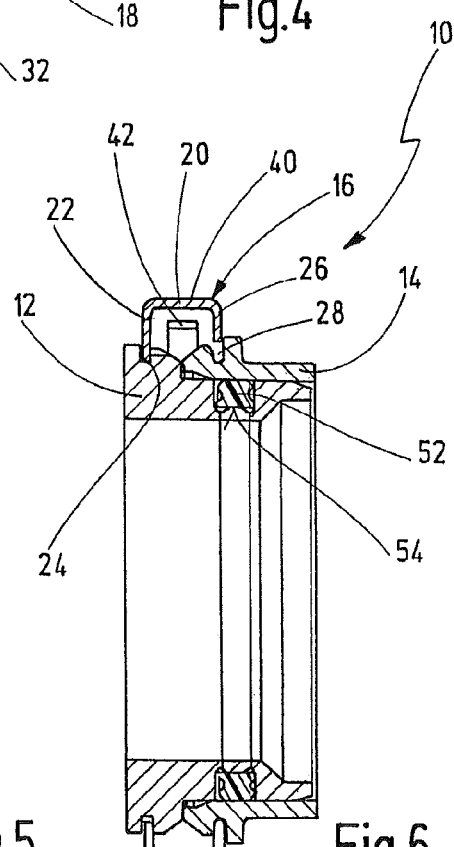
FIG. 6 shows a longitudinal sectional view through the plug connection arrangement of FIG. 5.

In FIGS. 5 and 6, a further embodiment of a plug connection arrangement 10 is shown, which, with respect to structure and working method, corresponds generally to the plug connection arrangement of FIGS. 1 to 3. Same elements are therefore provided with the same reference numerals. Essentially only the differences are described below.

On the one hand, it is apparent in FIG. 5 that the pipe socket 12 according to FIG. 5 is part of a pipe 50, which, in turn, can be part of a charge—air arrangement for turbochargers. Alternatively, the pipe 50, when connected to the second hollow body 14 by the plug connection arrangement 10, can form a silencer.

As is shown in FIG. 6, the pipe socket 12 has on its outer periphery a peripheral groove 54, in which a sealing ring 52, such as an O-ring, is inserted. The peripheral groove 54 and the sealing ring 52 inserted therein are covered by the hose portion which is slipped onto the pipe socket 12. Accordingly, a direct seal between the hose 14 and the pipe socket 12 can be obtained. The seal can be enhanced by the spring tension 30 (not represented in FIG. 6) in force in the final assembly position.

The hose 14 is dimensioned such that it butts axially against an annular shoulder (not specifically detailed in FIG. 6) of the pipe socket 12. In this position, the radial groove 28 lies within the second radial tongues 26, so that, starting from the pre-assembly position shown in FIG. 6, the final assembly position can easily be established by twisting of the spring clip 16.

Although, in the above-described embodiments, the spring clip is pre-assembled on a pipe socket, it is also possible to pre-assemble the spring clip on the hose. Similarly it is possible, instead of a hose and a pipe socket, to connect two pipe sockets or two hoses to each other, in which case the spring clip can respectively be pre-assembled on one of the two elements.

Finally, it is also conceivable to configure a spring clip 16 without second radial tongues 26. In this case, the outer periphery of the hose 14 can also be configured with no radial groove 28. Here, the connection between the pipe socket 12 and the hose 14 is established essentially non-positively via the spring clip 16, to be precise by means of the spring tension 30.

The invention claimed is:

1. A plug connection arrangement comprising:
   a first hollow tubular body,
   a second hollow tubular body having an end axially joined to the first hollow tubular body, and
   a radially expandable spring clip configured to exert a radially inwardly directed spring force, said spring clip having a first radial tongue and a second radial tongue axially displaced from said first radial tongue such that said second radial tongue is positioned over said end of said second hollow tubular body;
   wherein said first hollow tubular body has a pre-assembly portion on which said first radial tongue of said spring clip is received in a pre-assembly position,
   wherein said first hollow tubular body has a final assembly portion displaced peripherally and radially inwardly from said pre-assembly portion for receiving said first radial tongue in a final assembly position, and
   wherein both said first radial tongue and said second radial tongue are displaced radially inwardly under the spring force of said spring clip upon the rotation of said spring clip relative to said first hollow tubular body from said pre-assembly position to said final assembly position to thereby secure said second hollow tubular body to said first hollow tubular body.

2. The plug connection arrangement of claim 1, wherein said second hollow tubular body has a first peripheral groove formed on said end, and wherein said second radial tongue is configured to engage said first peripheral groove in said final assembly position.

3. The plug connection arrangement of claim 1, wherein said first hollow tubular body has a second peripheral groove that includes said pre-assembly portion and said final assembly portion.

4. The plug connection arrangement of claim 3, wherein said spring clip is axially secured to said first hollow tubular body in said pre-assembly position.

5. The plug connection arrangement of claim 1, wherein said spring clip comprises a plurality of first and second radial tongues.

6. The plug connection arrangement of claim 1, wherein said second radial tongue is shorter than said first radial tongue.

* * * * *

UNITED STATES PATENT AND TRADEMARK OFFICE
CERTIFICATE OF CORRECTION

PATENT NO. : 8,419,076 B2  
APPLICATION NO. : 12/769684  
DATED : April 16, 2013  
INVENTOR(S) : Uwe Keller et al.

Page 1 of 1

It is certified that error appears in the above-identified patent and that said Letters Patent is hereby corrected as shown below:

Title Page, Item (73) Assignees,

First and second lines, "Muhy und Bender KG" should be -- Muhr und Bender KG --.

Signed and Sealed this  
Sixteenth Day of July, 2013

Teresa Stanek Rea  
*Acting Director of the United States Patent and Trademark Office*